United States Patent [19]

Baba

[11] Patent Number: 6,029,007
[45] Date of Patent: *Feb. 22, 2000

[54] DIGITAL SEMICONDUCTOR INTEGRATED CIRCUIT AND DIGITAL CONTROL SYSTEM USING THE SAME

[75] Inventor: Shirou Baba, Tokorozawa, Japan

[73] Assignee: Hitachi, Ltd., Tokyo, Japan

[*] Notice: This patent is subject to a terminal disclaimer.

[21] Appl. No.: 07/490,513

[22] Filed: Mar. 1, 1990

Related U.S. Application Data

[63] Continuation of application No. 07/349,418, May 9, 1989, abandoned, which is a continuation of application No. 07/159,766, Feb. 24, 1988, abandoned, which is a continuation of application No. 06/862,641, May 13, 1986, Pat. No. 4,736,337, which is a division of application No. 06/587,524, Mar. 8, 1984, Pat. No. 4,630,207, which is a continuation of application No. 06/213,923, Feb. 5, 1981, Pat. No. 4,451,891.

[30] Foreign Application Priority Data

Feb. 20, 1980 [JP] Japan .................................... 55-18986

[51] Int. Cl.⁷ .................................................... G06F 15/78
[52] U.S. Cl. .............. 395/800; 364/431.12; 364/DIG. 2; 364/925.6; 364/926; 395/775
[58] Field of Search ............................. 364/600, 431.04, 364/431.12, 706, 709.01, 709.11, 709.12; 395/800, 325, 775

[56] References Cited

U.S. PATENT DOCUMENTS

| | | | |
|---|---|---|---|
| 3,969,724 | 7/1976 | Anderson et al. | 395/375 |
| 4,118,772 | 10/1978 | Takada | 364/187 |
| 4,219,875 | 8/1980 | Templeton | 395/550 |
| 4,276,601 | 6/1981 | Tokuda et al. | 364/431.12 |
| 4,287,558 | 9/1981 | Nishitani | 395/275 |
| 4,291,656 | 9/1981 | Miyagi et al. | 123/320 |
| 4,308,598 | 12/1981 | Mahmood | 367/79 |
| 4,403,302 | 9/1983 | Young et al. | 395/775 |
| 4,451,891 | 5/1984 | Baba | 364/431.12 |
| 4,736,337 | 4/1988 | Baba | 395/800 |

FOREIGN PATENT DOCUMENTS

| | | |
|---|---|---|
| 2841750 | 12/1978 | Germany . |
| 50-114136 | 2/1975 | Japan . |

OTHER PUBLICATIONS

Nikkei Electronics, 1978, 102., pp. 137–151, "1–Chip Microcomputer with 8–Bit A–D Converter Incorporated Bringing about Sharp Reduction of System Components", W. Check et al.

MCS–48 Single Chip Family of Microcomputers Product Description, Intel–Feb. 1979, pp. 32–34.

Nedbal, Richard A., "A Single Chip Microcomputer with System Features," *SAE Technical Paper Series,* Society of Automotive Engineers, Inc., 1979, pp. 1–9.

"S2000 Single–Chip Microcomputer Family," American Microsystems, Inc. (AMI)—Advanced Product Description, Apr. 1979, pp. 1–15.

"S2200/S2200A, S2400/S2400A, S2210 Single–Chip Microcomputers," American Microsystems, Inc. (AMI)—Preliminary Data Sheet, Jul., 1979, pp. 1–38.

*Primary Examiner*—Paul V. Kulik
*Attorney, Agent, or Firm*—Fay, Sharpe, Beall, Fagan, Minnich & McKee

[57] ABSTRACT

A digital semiconductor integrated circuit is equipped with: a digital signal input circuit; an analog signal input circuit made receptive of an analog signal for feeding out a digital signal corresponding to the analog signal; and a common external terminal connected commonly with the input terminals of the digital signal input circuit and the analog signal input circuit. By a suitable switch circuit, the common external terminal can be used as either an analog signal input terminal or a digital signal input terminal. As a result, the number of the external output terminals required can be reduced.

52 Claims, 4 Drawing Sheets

DIGITAL SEMICONDUCTOR INTEGRATED CIRCUIT AND DIGITAL CONTROL SYSTEM USING THE SAME

This application is a continuation of application Ser. No. 07/349,418, filed May 9, 1989, abandoned; which is a continuation application of Ser. No. 07/159,766, filed Feb. 24, 1988, abandoned; which is a continuation application of Ser. No. 06/862,641, filed May 13, 1986, now U.S. Pat. No. 4,736,337, which is a divisional application of Ser. No. 06/587,524, filed Mar. 8, 1984, now U.S. Pat. No. 4,630,207; which is a continuation application of Ser. No. 06/213,923, filed Feb. 5, 1981, now U.S. Pat. No. 4,451,891.

BACKGROUND OF THE INVENTION

The present invention relates to a monolithic integrated circuit containing an analog to digital converter (which will be shortly referred to as the "A/D converter") for forming at least a part of a digital control system.

A digital control system can-have its size reduced by using a semiconductor integrated circuit. Moreover, the digital control system can be made to exhibit a relatively high reliability by being enabled to reduce the number of the external wires of the semiconductor integrated circuit.

In order to make a system control of high quality possible, a control system such as a process control system (making use of a microprocessor) or a computing control system is made receptive of not only the signals of various kinds of sensors (which will be referred to as the "digital sensors") made operative of digital or pulse signals but also analog signals bearing much information through the A/D converter.

In this case, both an input circuit (i.e., a digital input circuit) for feeding from the data signal from a digital sensor to the data bus of a microprocessor and an input circuit (i.e., an analog input circuit) for feeding the data signal from an analog sensor to the aforementioned data bus after it has been converted into a digital signal are desired to be constructed of a one-chip monolithic semiconductor integrated circuit (which will be shortly referred to as the "monolithic IC" or "IC") in order partly to reduce the size of a device constructing the system and partly to-reduce the number of the external wirings of that device, as has been described in the above.

Moreover, the aforementioned monolithic IC is desired to be so constructed that it can be applied to a variety of control systems.

By affording the general usability of the aforementioned monolithic IC, this monolithic IC can be used in a variety of different control systems so that the maintenance of the various control systems can be facilitated. Moreover, the change and development of the control systems can also be facilitated.

In the usual monolithic IC, however, it should be noted that the number of the external terminals to be attached to the package thereof is limited by the size of that package, for example.

In case the number of the external terminals to be attached to the IC package is limited so that the numbers of both analog and digital input terminals are accordingly limited, the monolithic IC has its applicability limited to a restricted control system.

For instance, the monolithic IC, which has its digital input terminals relatively reduced by the provision of a relatively great number of the analoq input terminals, is difficult to use in a control system having a relatively great number of digital input signals. On the contrary, the monolithic IC, which has its analoq input terminals relatively reduced by the provision of a relatively great number of the digital input terminals, is difficult to use in the control system which is fed with a relatively great number of analog input signals.

The monolithic IC having the construction thus far described makes it difficult to change the control systems.

For example, the output data signal from the analog sensor has its level made proportional to the physical quantity to be detected so that it can bear more information than that output data signal from the digital sensor, which is made to correspond to whether the physical quantity to be detected exceeds a certain threshold level or not. Therefore, the control system developed in advance can be easily changed, if the digital sensor can be replaced by the analog sensor, into such a control system as can perform a system control of higher quality. However, in case the monolithic IC having its digital input terminals relatively increased is used, the aforementioned system change becomes difficult because the analog input terminals are relatively reduced.

In case the monolithic IC is to be equipped with the number of analog and digital input terminals required, the size of its package has to be enlarged because of the increase in the number of external terminals.

SUMMARY OF THE INVENTION

It is, therefore, an object of the present invention to provide a semiconductor integrated circuit which forms at least a part of a digital control system and which exhibits high general usability even with a relatively small number of external terminals.

Another object of the present invention is to provide a semiconductor integrated circuit which can further reduce the number of its external terminals.

A further object of the present invention is to provide a digital control system using the semiconductor integrated circuit of the aforementioned type.

Other objects of the present invention will become apparent from the following description taken in conjunction with the accompanying drawings.

According to the present invention, the semiconductor integrated circuit is equipped with signal receiving common external terminals which can receive both analog input signals and digital input signals. The aforementioned common external terminals are used as either the external terminals for receiving the digital signals or the external terminals for receiving the analog signals in accordance with the control by such a program as operates the control system.

In accordance with the present invention, moreover, the semiconductor integrated circuit is further equipped, if necessary, with such common external terminals as can partly receive digital input signals and partly generate digital output signals.

DESCRIPTION OF THE PREFERRED EMBODIMENTS

The present invention will be described in detail in the following in connection with the embodiments thereof.

Figure 1A:
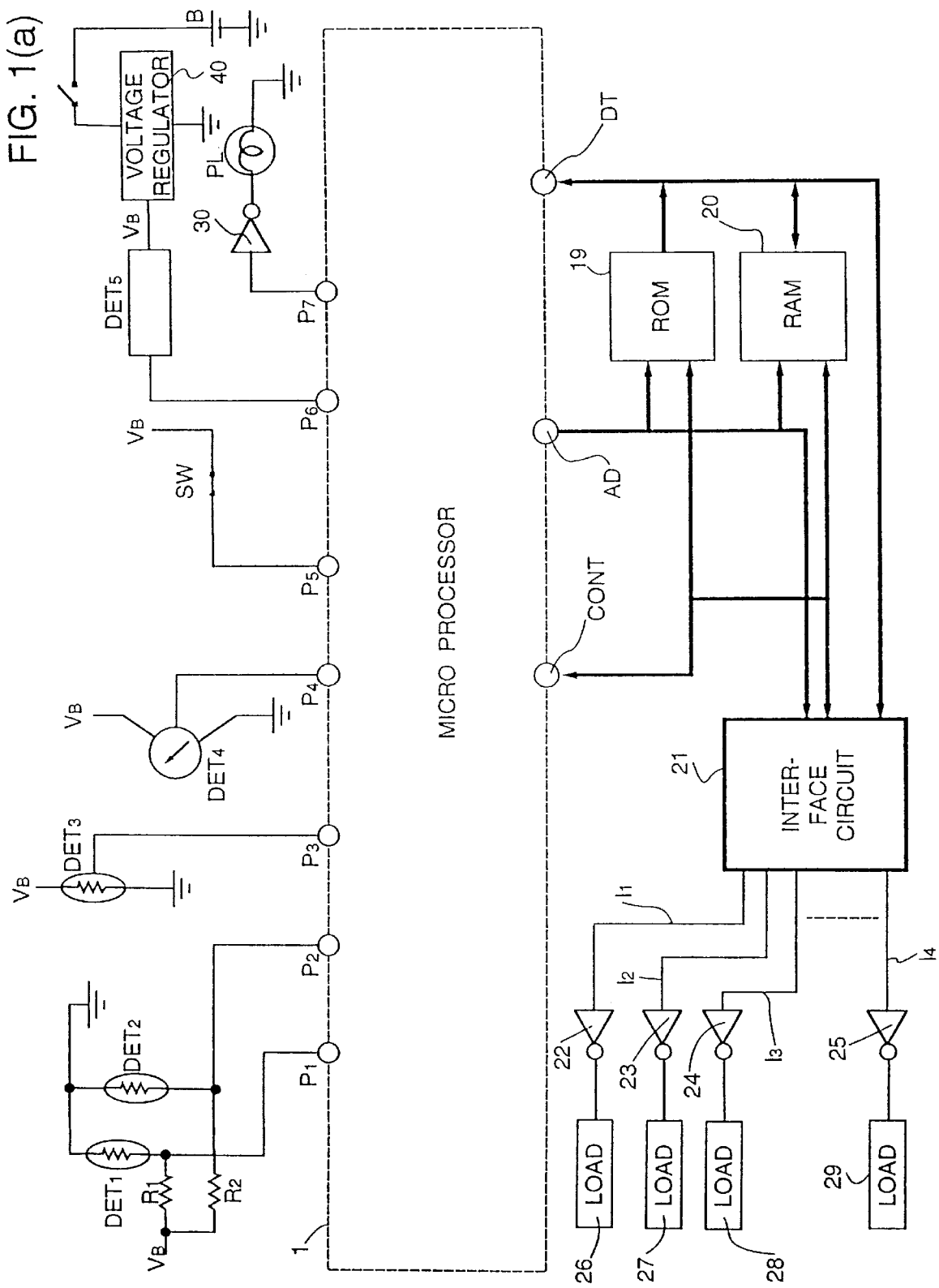
FIG. 1 is a block diagram showing the circuit of one embodiment of the present invention.
Figure 1B:
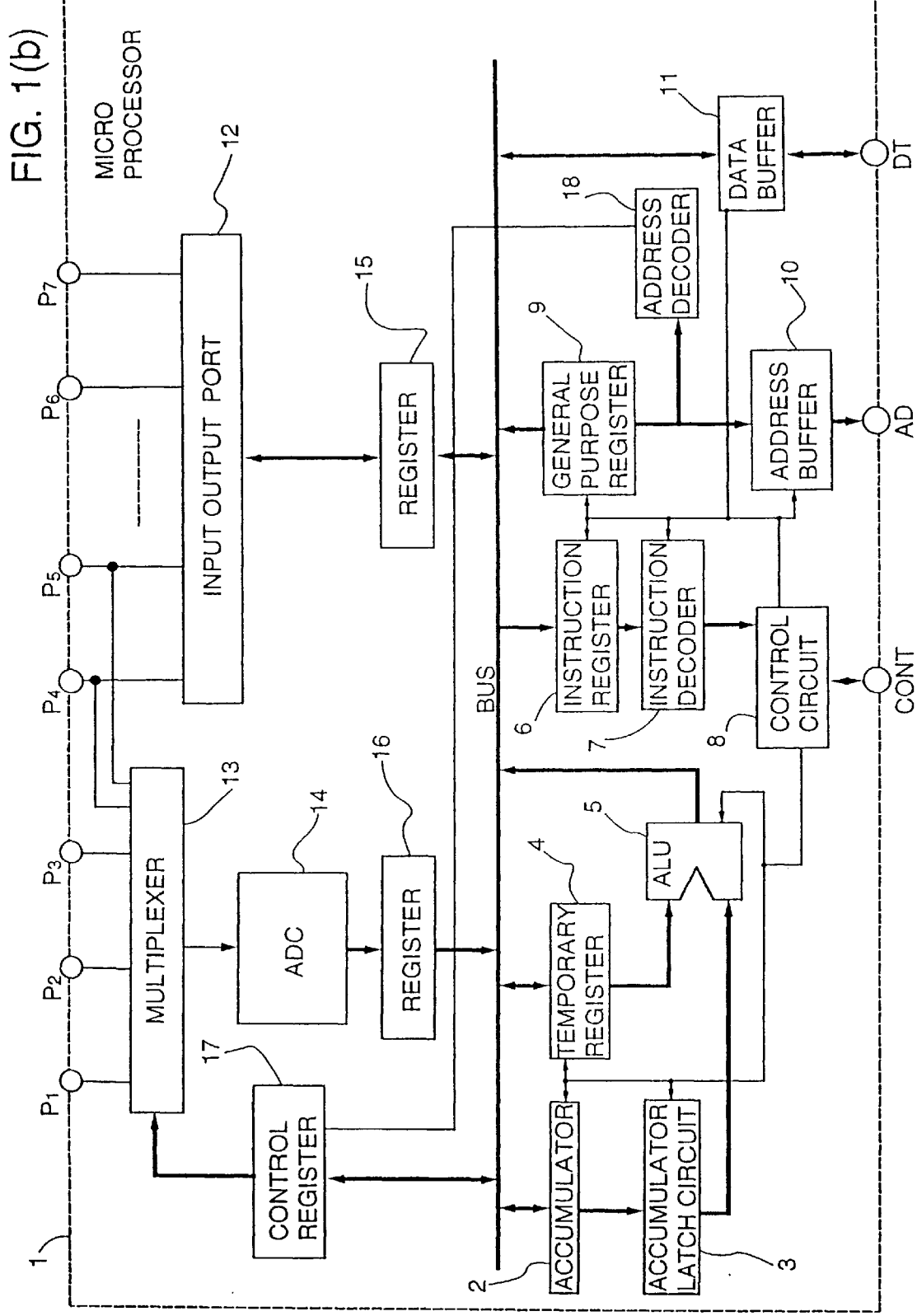

FIG. 1 is a block diagram showing one embodiment of the present invention.

Generally indicated at reference numeral 1 is a microprocessor which is constructed into a one-chip monolithic semiconductor integrated circuit composed of such respective circuit blocks 2 to 18 as will be described in the following.

Indicated at numeral 2 is an accumulator which has its data input and output terminals coupled to an internal data bus line BUS. Indicated at numeral 3 is an accumulator latching circuit which is coupled to the aforementioned accumulator 2. Indicated at numeral 4 is a temporary register which has its data input and output terminals coupled to the aforementioned internal data bus line BUS. Indicated at numeral 5 is an arithmetic and logic unit which is made receptive to the output data of the aforementioned accumulator latch circuit 3 and the temporary register 4 as its operand. The circuits 2 to 5 thus far described construct together an arithmetic unit and have their respective operations controlled by the control signals which are generated by a timing control circuit 8.

The aforementioned arithmetic and logic unit 5 has its operation so controlled by the output signal of the timing control circuit 8 as to perform an arithmetic operation such as addition or subtraction or an OR, AND, exclusive or logical operation.

The output data of the aforementioned arithmetic and logic unit 5 are different in accordance with the control signal, which is generated by the timing control circuit 8, but are fed out to the accumulator 2 through the internal data bus line BUS, for example.

Numerals 6 and 7 indicate an instruction register and an instruction decoder and machine cycle encoder, respectively. The circuits 6 to 8 thus far described construct together a control unit.

The aforementioned instruction register 6 is provided to receive the instruction which is fed to the internal data bus line BUS through an external data bus line DT and a data buffer 11 from such as ROM (i.e., a read only memory) 19 as is disposed at the outside of the microprocessor 1.

The instruction, which is received by the aforementioned instruction register 6, is fed to the aforementioned circuit 7 so that it is decoded by the instruction decoder in that circuit 7. The resultant output of the aforementioned instruction decoder is fed to the machine cycle encoder in the aforementioned circuit 7. The aforementioned machine cycle encoder generates a variety of timing signals which are determined by the output signal of the aforementioned instruction decoder.

The aforementioned timing control circuit 8 has its operational timing controlled by the clock signals fed from grouped external control terminals CONT so that it generates both a bus control signal for receiving the data fed from the external data bus line DT and a strobe signal for writing out the data to the external data bus line DT.

Moreover, the aforementioned timing control circuit 8 examines a series of signals such as an interrupt signal fed from the grouped external control terminals CONT, a hold signal for holding the operations of the system and a reset signal so that it feeds out a series of signals such as a flag signal indicating the reception of the interruption or a flag signal indicating the reception of the requirement for the hold through the aforementioned grouped external control terminals in response to those signals examined.

Indicated at numeral 9 is a register group which is composed, although not shown, of general purpose resisters, a stack pointer and a program counter.

The general purpose registers of the aforementioned register group 9 are used for memory operation in addition for handling data (including double length data). The stack pointer is used to memorize the return address of a subroutine jump. The program counter is a register for memorizing the address of the instruction to be subsequently read out, and its data are increased one by one each time one instruction is executed except for that the instruction to be fed to the instruction register 6 is the jump instruction.

Indicated at numeral 18 is an address decoder which is made responsive to the output of the general purpose register of the register group 9 thereby to generate a signal for controlling later-described circuits 15 to 17. Incidentally, the circuits 15 to 17 can be controlled by the general purpose registers of the register group 9. However, by using the address decoder circuit 18, as show, the aforementioned circuits 15 to 17 can also be controlled even with the use of a small number of the general purpose registers.

Indicated at numeral 10 is an address buffer which is made receptive to the output signals from the register group 9 thereby to generate an address signal to be fed to the ROM 19, an RAM 20 and an interface circuit 21.

Indicated at numeral 11 is a data buffer which effects interchanges of the data between the external data bus line DT and the internal data bus line BUS.

In the embodiment being described, the external terminals $P_1$ to $P_3$ of the microprocessor 1 are used as the input terminals for exclusively receiving the analog signals, and the external terminals $P_6$ and $P_7$ are used as the input and output terminals for exclusively feeding and receiving the digital signals. On the other hand, the external terminals $P_4$ and $P_5$ are used as common terminals for the input of the analog signals and for the input and output of the digital signals.

In the present embodiment, although not limited thereto, the aforementioned external terminal $P_4$ is fed with the analog signals which are generated by an analog sensor $DET_4$, and the aforementioned external terminal $P_5$ is fed with the digital signals which are generated by a switch SW. The aforementioned external terminal $P_6$ is fed with the digital signals which are generated by a digital sensor $DET_5$. The aforementioned external terminal $P_7$ is fed with the digital signals which are used to drive a lamp PL.

Indicated at numeral 12 is a digital input output port which is connected between the aforementioned external terminals $P_4$ to $P_7$ and the register 15.

Whether the aforementioned respective external terminals $P_4$ to $P_7$ are used as the digital input terminals or the digital output terminals or not is determined by the control data which are set in the aforementioned register 15.

The aforementioned control data to be fed to the aforementioned register 15 are fed out of the ROM 19 together with the instruction. The input timing of the aforementioned control data is controlled by the control signal which is fed out of the address buffer 10 in accordance with the execution of the program written in the ROM 19.

The aforementioned register 15 is set with both the digital input data, which are fed through the aforementioned input output port 12, and the digital output data which are fed from the aforementioned internal data bus line BUS until it is to be fed to the external terminals $P_4$ to $P_7$.

The digital input data, which are set in the aforementioned register 15, are written in the RAM 20 through the internal data bus line BUS and the data buffer 11.

The setting operation of the control data in the aforementioned register 15, the setting operation of the digital output data, and the reading operation of the digital input data, which are set in the aforementioned register 15, are under the control of the program which is written in advance in the ROM 19.

At the time of writing the digital input data, which are fed to the external terminal $P_5$, into the RAM 20, there is fed out of the address decoder 18 the control signal for transferring the set data of the aforementioned register 15, which is set to have a value corresponding to the digital input data fed to the aforementioned external terminal $P_5$, to the internal data bus line BUS.

Likewise, at the time of writing the digital input data, which are fed to the external terminal $P_6$, into the RAM 20, a control signal similar to the signal for transferring input data from register 15 to the internal bus line BUS is fed out of the address decoder 18.

The program for writing the digital input data, which are fed from an element such as the starter switch of an automotive engine, into the RAM 20, is executed for a predetermined time period at the start of the engine. Furthermore, the program for writing for writing the digital input data, which, for example, are fed from the crank angle sensor of the engine, into the RAM 20 is executed once for a relatively short period of several milliseconds.

In order to use the external terminal $P_7$ as the output terminal for the digital signals, the ROM 19 is written with the program such as the control data presetting program which is executed immediately after the system is fed with the power from a power source. As a result, the aforementioned input output port 12 is so controlled by the control data set in the aforementioned register 15 as to transfer the digital output data in the aforementioned register 15 to the aforementioned external terminal $P_7$. From the address decoder 18, there is fed a control signal which is used for setting such digital output data in the aforementioned register 15 as are fed from the circuit 5 to the internal data bus line BUS.

Indicated at numeral 13 is an analog multiplexer which has its input terminal coupled to the corresponding external terminals $P_1$ to $P_5$, respectively, and its output terminal coupled to the input terminal of an A/D converter 14.

The aforementioned A/D converter 14 is fed with such one of the analog input signals fed to the plural external terminals as is selected by the aforementioned analog multiplexor 13.

Such external terminal of the plural external terminals and such selecting timings thereof as are to be selected by the aforementioned analog multiplexer 13 are determined by the control signals which are fed out of a control register 17.

The control signals to be set in the aforementioned control register 17 are fed to the internal data bus line BUS through the data buffer 11 from the aforementioned ROM 19 written with the program, and the control signals for setting the aforementioned control signals in the aforementioned control register 17 are fed out of the aforementioned address decoder 18.

The respective input timings of the aforementioned analog input signals are suitably determined by a which is written in advance in the ROM 19.

For example, the level of the analog input signals to be fed out of a temperature detecting element such as a thermistor is varied at a relatively slow rate. It is, therefore, sufficient that such analog input signals are selected once for a relatively long period. On the contrary, the analog input data to be fed out of a detecting element such as the tachometer of the engine are selected once for a relatively short period.

The analog input data thus selected by the aforementioned analog multiplexer 13 are converted by the aforementioned A/D converter 14 into digital data signals of several bits.

The digital data signals fed from the aforementioned A/D converter 14 are held in a register 16.

The digital data signals thus held in the aforementioned register 16 are transferred to the aforementioned internal data bus line BUS by the control of the register 17 with the control signals which are fed from the address decoder 18. The digital data signals in the aforementioned internal data bus line BUS are written in the aforementioned RAM 20 through the data buffer 11.

In order to receive the analog input signal fed to one of the external terminals, therefore, the group of the programs both for setting the control signals in the control register 17 and for transferring the digital data signals from the aforementioned register 16 to the internal data bus line BUS at the time of the end of the A/D conversion are executed.

In the embodiment being described, the terminal $P_5$ of the aforementioned common terminals $P_4$ and $P_5$ is fed with the digital signals. Therefore, the signal fed to the aforementioned common terminal $P_5$ is not detected as an analog signal.

As a result, the ROM 19 is not set with the program for transferring the signal, which is fed to the aforementioned common terminal $P_5$, to the internal data bus line BUS through the aforementioned analog multiplexer 13, A/D converter 14 and register 16.

In other words, the ROM 19 is not written with the instruction of setting the control signals, which instruct the aforementioned terminal $P_5$, in the control register 17. The ROM 19 is not written with the instruction of transferring the set data having no special meaning from the aforementioned register 16 to the internal data bus line BUS. In the manner thus far described, the aforementioned A/D converter 14 can be prevented from being unnecessarily operated, and the number of the instructions to be written in the aforementioned ROM 19 can be reduced. Incidentally, the signals at the aforementioned terminal $P_5$ may be unconditionally set in the aforementioned register 16 through the aforementioned analog multiplexer 13 and the aforementioned A/D converter 14. Even in this case, the aforementioned terminal $P_5$ can be prevented from being substantially selected by the fact that the instruction of transferring the data from the aforementioned register 16 to the aforementioned internal data bus line BUS is not written in the ROM 19.

Incidentally, when the aforementioned common terminals $P_4$ and $P_5$ are used as the analog signal input terminal or the digital signal input terminal, the aforementioned input output port 12 is made to exhibit high output impedance characteristics for those terminals $P_4$ and $P_5$. As a result, the analog input signal level or the digital input signal level to be fed to the aforementioned terminals $P_4$ and $P_5$ is prevented from being disturbed by the aforementioned input output port 12.

Figure 2:
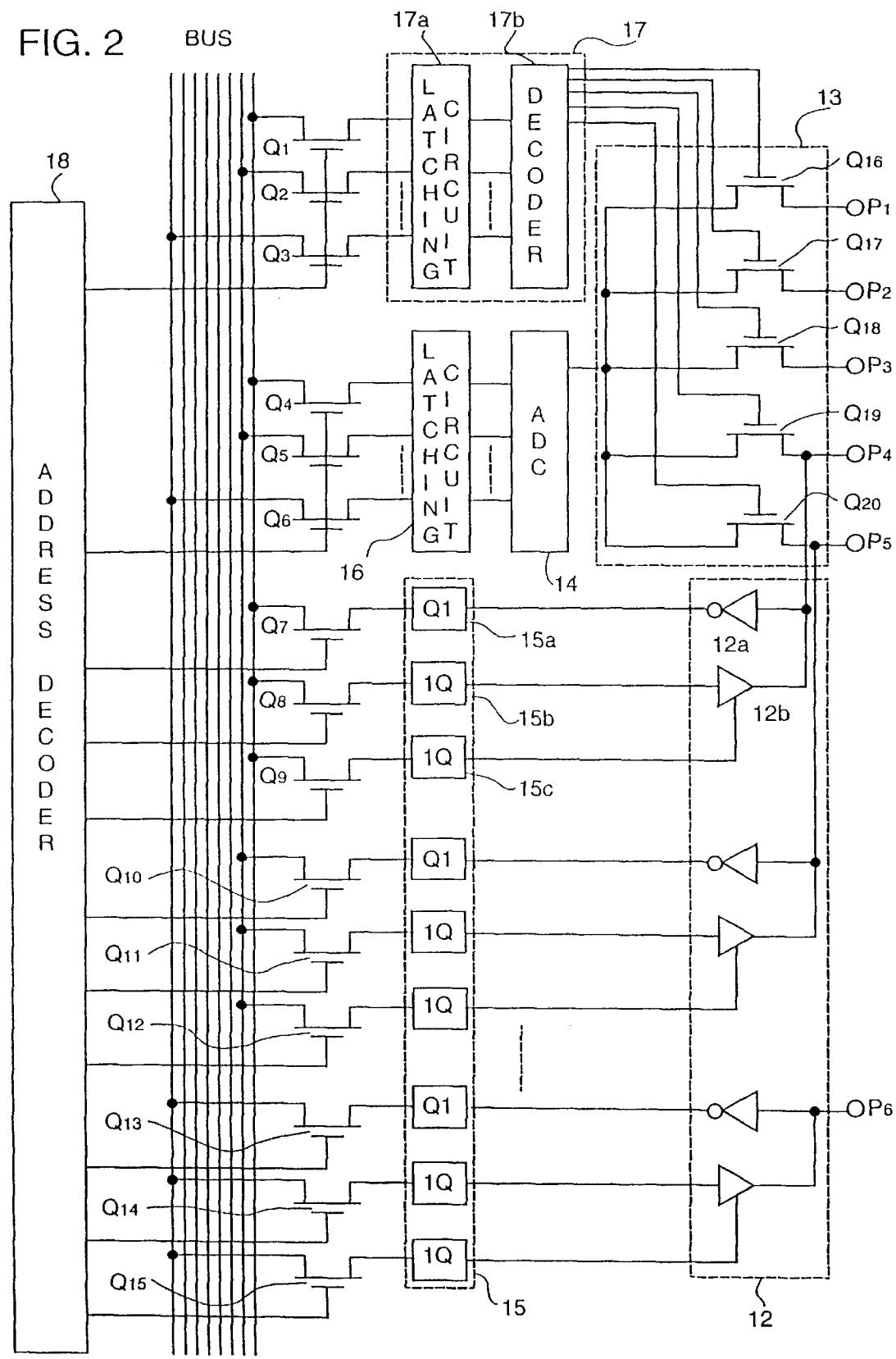
FIG. 2 is a block diagram showing the detailed construction of the circuit blocks of FIG. 1.

The operations and a specific construction of the circuits thus far described will be understood in more detail in view of the following description taken in conjunction with the circuit diagram shown in FIG. 2.

In FIG. 2, the multiplexer 13 is constructed of transfer gate MISFETs $Q_{16}$ to $Q_{20}$ which have their respective gate electrodes coupled to the register 17.

The aforementioned register 17 is constructed of a latching circuit 17a and a decoder circuit 17b. The aforementioned latching circuit 17a has its plural input terminals coupled to the internal data bus line BUS through transfer gate MISFETs $Q_1$ to $Q_3$ and its plural output terminals coupled to the plural input terminals of the aforementioned decoder circuit 17b.

The aforementioned register 17 is set with the signal in the internal data bus line BUS by rendering the MISFET $Q_3$ conductive in response to the output signal of the address decoder 18.

The decoder circuit 17b decodes the signal of the aforementioned latching circuit 17a thereby to generate a signal for selecting such one from the transmission MISFETs $Q_{16}$ to $Q_{20}$ in the multiplexer 13 as corresponds to the signal received by the aforementioned latching circuit 17a.

As a result, the selecting operations of the aforementioned multiplexer 13 are executed such that the address signal instructing the aforementioned latching circuit 17a is fed from the grouped registers 9 to the address decoder 18 and such that the multiplexer selecting data are fed to the internal data bus line BUS.

The register 16 has its plural input terminals coupled to the plural output terminals of the A/D converter 14 and its plural output terminals coupled to the aforementioned internal data bus line BUS through transmission gate MISFETs $Q_4$ to $Q_6$.

These transmission gate MISFETs $Q_4$ to $Q_6$ are rendered conductive when the address signal instructing the aforementioned register 16 is fed from the grouped registers 9 of FIG. 1 to the aforementioned address decoder 18. As a result, the A/D conversion signals, which are fed from the aforementioned A/D converter 14 to the aforementioned register 16, are further fed to the internal data bus line BUS through the aforementioned transmission gate MISFETs $Q_4$ to $Q_6$.

The input output port 12 for receiving and feeding the digital signal is constructed, as shown, of input and output buffer amplifiers 12a and 12b which are to be coupled in a one-to-one relationship to the terminals $P_4$ to $P_7$, respectively.

The aforementioned input buffer amplifier 12a is further constructed of a high input impedance circuit such as an inverter made of a well-known MISFET in order that it may not adversely affect the level of the signal fed from either the output buffer amplifier 12b or the external sensor.

The aforementioned output buffer amplifier 12b is constructed of a well-known tri-state circuit which in turn is made of a MISFET. The gate signal for controlling the operation of the aforementioned output buffer amplifier 12b is fed from the latching circuit 15c in the register 15.

If the output signal of the aforementioned latch circuit 15c is at a high level, for example, the aforementioned output buffer amplifier 12b is rendered operative so that a digital signal at a high or low level is fed from the aforementioned output buffer amplifier 12b to the external terminal $P_4$. If, on the contrary, the output signal of the aforementioned latching circuit 15c is at a low level, the output terminal of the aforementioned output buffer amplifier 12b is rendered to have a high impedance state or a floating state.

The register 15 is constructed of a latching circuit 15a, which is receptive of the output signal fed from the input buffer amplifier 12a of the aforementioned input output port 12, a latching circuit 15b, which is operative to feed the signal to the input terminal of the output buffer amplifier 12b, and the aforementioned latching circuit 15c which is operative to feed the gate input signal to the output buffer amplifier 12b, as has been described in the above.

Although not especially limited, all of the output terminals. of the latching circuit 15a, which is provided to correspond to the external terminal $P_4$, the input terminal of the latching circuit 15b, and the input terminal of the latching circuit 15c are commonly coupled, as shown, to the one bit line of the internal data bus line BUS through transmission gate MISFETs $Q_7$, $Q_8$ and $Q_9$, respectively.

Likewise, the input and output terminals of the latching circuits in the register 15, which are provided to correspond to the external terminal $P_5$, are commonly coupled to the other bit line through transmission MISFETs $Q_{10}$, $Q_{11}$ and $Q_{12}$, respectively, whereas the input and output terminals of the latching circuit in the register 15, which are provided to correspond to the external terminal $P_7$, are commonly connected with another bit line through transmission gates MISFETs $Q_{13}$, $Q_{14}$ and $Q_{15}$, respectively.

The aforementioned transmission gates MISFETs $Q_7$ to $Q_{15}$ are fed with the addresses, which are selected by the address decoder 18, respectively.

In accordance with the construction thus far described, the analog input converted into a digital signal, and the digital input are made common by the internal data but line BUS. As a result, the reception of the input signals of the aforementioned two kinds is performed by making different the address instructions of the registers 16 and 15.

In case the common external terminal $P_5$ is used as the digital input terminal, as shown in FIG. 1, the ROM 19 is written with the program containing both the instruction of resetting the latch circuit in the register 15, which corresponds to the transmission gate MISFET $Q_{12}$, and the instruction of feeding the digital signal, which is fed to the external terminal $P_5$ to the internal data bus line BUS through the transmission gate MISFET $Q_{10}$. In this case, incidentally, the aforementioned ROM 19 is neither written with the instruction of selecting the transmission gate MISFET $Q_{11}$ nor the instruction of selecting the MISFET $Q_{20}$ of the multiplexer 13.

Likewise, the aforementioned ROM 19 is written with both the instruction of resetting the latch circuit 15c of the register through the transmission MISFET $Q_9$ and the instruction of selecting the transmission gate $Q_{19}$ of the multiplexer 13 but not with the instruction of selecting the transmission gates $Q_7$ and $Q_8$.

The integrated circuit shown in FIG. 1 is used to control the engine although not limited thereto.

For this purpose, a thermistor $DET_1$ for detecting the temperature of engine cooling water is connected between the external terminal $P_1$ of the microprocessor 1 and the grounded point of the circuit, and a load resistor $R_1$ is connected between that thermistor $DET_1$ and a power source terminal $V_B$. If an element having a negative temperature coefficient is used as the aforementioned thermistor $DET_1$, the voltage to be applied to the aforementioned external terminal $P_1$ is decreased with the temperature rise of the engine cooling water.

Likewise, a thermistor $DET_2$ for detecting the sucked air temperature of the engine and a load resistor $R_2$ therefor are connected with the external terminal $P_2$.

A suction flow meter $DET_3$ is connected with the external terminal $P_3$. The suction flow meter $DET_3$ is constructed, for example, of a resistance member and a sliding contact which is shifted with respect to the resistance member in accordance with the suction flow rate. As a result, that suction flow meter feeds the aforementioned external terminal $P_3$ with a voltage according to the suction flow rate.

The tachometer of the engine, as indicated at letters $DET_4$, is connected with the external terminal $P_4$. The tachometer $DET_4$ feeds the aforementioned terminal $P_4$ with a voltage according to the rpm of the engine.

The starter switch SW of the engine is connected with the external terminal $P_5$.

A crank angle sensor of the engine, as indicated at letters $DET_5$, is connected with the external terminal $P_6$. The sensor $DET_5$ is so constructed as to generate such pulse signals as take a high level when the crankshaft comes to a predetermined angular position, e.g., of 0 degrees.

On the other hand, the external terminal $P_7$ is used as an output terminal for warning the engine temperature, for example. The lamp PL is so driven by a buffer circuit 30 which is made receptive of the output of the aforementioned terminal $P_7$ that it is lit when the engine temperature reaches an abnormal level.

The interface circuit 21 is fed with the control signal from the grouped external terminals CONT of the microprocessor 1, the address signal from an address bus AD and the data from the data bus DT. The interface circuit 21 has a plurality of output lines $l_1$ to $l_4$ and contains therein such (not-shown) memory circuits as are respectively selected by the address signals of the address bus AD and as have their states determined by the data signals of the data bus DT.

The signal of the output line $M_1$ of the aforementioned interface circuit 21 is fed through an output buffer circuit 22 to an ignition coil 26, whereas the signal of the output line $M_2$ is fed through an output buffer circuit 23 to a solenoid 27 for adjusting the throttle valve in the suction manifold of the engine. On the other hand, the signal of the output line $M_3$ is fed through an output buffer circuit 24 to an electromagnetic type fuel pump 28, whereas the signal of the output line $M_4$ is fed to a relay 29 for driving the starter of the engine.

In the embodiment being described, in order to control the engine, the ROM 19 is stored with not only the program but also the various interpolation data which are determined by the characteristics of the engine to be controlled.

For example, the angle of ignition advance of the ignition plug is determined by not only the rpm of the engine but also the engine characteristics. Therefore, the ignition timing data for the rpm of the engine have to be set in advance in the ROM 19. In this instance, the data of the engine characteristics for the aforementioned ignition timing data are not set in the ROM in a manner to correspond all the rpms of the engine but are set as such interpolation data in the ROM as correspond only to several rpms of the engine so that the capacity of the ROM can be reduced.

Likewise, the solenoid for controlling the throttle valve is controlled in accordance with the suction temperature, the engine temperature, the rpm of the engine and the engine characteristics. The data of these engine characteristics for controlling the solenoid are set as the interpolation data in the ROM.

The various engine control data when the engine is practically at its operating condition are prepared by the arithmetic operations of the microprocessor 1, which is made receptive of the data fed from the aforementioned various sensors and the various interpolation data written in advance in the aforementioned ROM 19.

Referring to FIG. 1, when a key switch $S_0$ is turned on, the power source voltage is fed from a battery B to a constant voltage circuit 40 so that the power source voltage $V_B$ is fed from that constant voltage circuit 40 to the aforementioned respective circuits.

The analog data such as the the temperature of the engine cooling water or the suction temperature, which are generated by the thermisters $DET_1$, $DET_2$ and the like when the microprocessor 1 becomes operative, are converted in a time-division manner into digital data by the action of the analog to digital converter 14. The respective digital data thus converted are written through the data bus in the random access memory (RAM) 20.

The fuel pump 28 is rendered operative by the output from the interface circuit 21.

When the starter switch SW is turned on, the relay 29 is rendered operative so that the starter (although not shown) starts its operation.

In order to reduce the capacity of the ROM 19, the data therein concerning the ignition timing, for example, are made to correspond only to the predetermined rpms sampled.

As a result, the data of the ignition timing from the tachometer $DET_4$ for any rpm of the engine by the arithmetic operation, in which the interpolation data in the ROM 19 for the sampled rpm near any of the aforementioned engine rpms are corrected in view of any engine rpm above-specified.

Thus, the practical ignition timing is calculated from the standard ignition timing based upon the output of the crank angle sensor $DET_5$ and from the ignition timing data determined by the aforementioned arithmetic operations. In accordance with the ignition timing thus calculated, the ignition coil 26 is driven.

The interpolation data of the ROM 19 for controlling the throttle valve in accordance with the rpm data of the engine, the temperature data of the engine cooling water and the suction temperature data are considered so that the pulse control signals for controlling the throttle valve are generated. By these pulse control signals, the duty ratio of the pulse current of the solenoid 27 to be coupled through the interface circuit 21 is changed. The solenoid 27 has its mean current changed by the duty ratio of the pulse current so that the throttle valve is controlled in accordance with the aforementioned duty ratio.

According to the embodiment thus far described, the various process controls of different requirements, in other words, the various process controls having different numbers of analog signal inputs and digital signal inputs and outputs are made possible by a reduced number of terminals so that the general usability of the various process controls of the microprocessor for controlling the automotive engine or the like can be improved. Moreover, the process controls of high quality, i.e, of high density are also made possible merely by changing a portion of the program even for the change in the system from the digital input to the analog input.

The present invention should not be limited to the embodiment thus far described but can be so modified that the port is constructed of such input and output ports as are independent of each other. In this modification, the common use of the terminals is made between the input port and the analog input.

Even in the case of commonly using the terminals, various modifications can be made such that all of the analog inputs are made common or such that all the digital inputs are made common.

Moreover, the system construction of the microprocessor can be modified in various manners.

Figure 3:
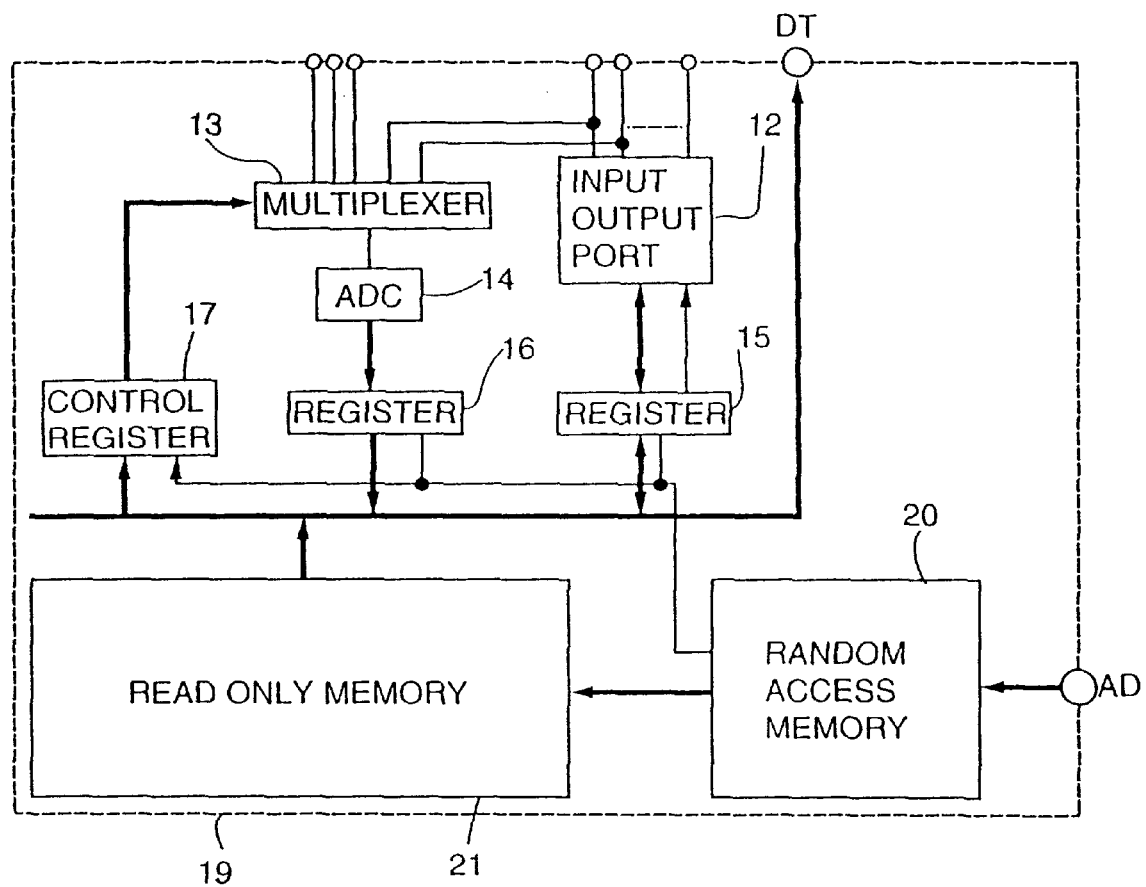
FIG. 3 is a block diagram showing the circuit of another embodiment of the present invention.

Still moreover, the system for effecting the various process controls is constructed, generally speaking, of a digital semiconductor integrated circuit of several chips, which is made of a microprocessor, a ROM (or RAM) written with a control program, and an RAM for holding various data. Therefore, the analog to digital input output circuit containing the aforementioned A/D converter may be provided, for example, as shown in FIG. 3, in the digital semiconductor integrated circuit 19 constructing the ROM written with the control program. More specifically, the digital semiconductor integrated circuit 19, which is constructed of the address decoder 20 and the memory array 21 written with the program instruction, is similarly with the input output port 12, the register 15, the multiplexer 13, the A/D converter 14 and the registers 16 and 17. With this construction, similar operations can be effected by connecting the data and address buses of the digital semiconductor integrated circuit 19 and the microprocessor through the external data and address buses.

Moreover, in the digital control system containing the RAM, the analog to digital input output circuit containing the aforementioned A/D converter may be provided in the digital semiconductor integrated circuit constructing the RAM, and the whole system of the microprocessor, ROM and RAM may be similar constructed of a one-chip digital semiconductor integrated circuit.

What is claimed:

1. A microprocessor in a single-chip with a ROM and a RAM, said microprocessor including:

an arithmetic and logic unit;

an internal bus;

digital signal input/output buffer means for coupling said internal bus and an external device to which an external coupling is to be made;

a plurality of external terminals;

an analog to digital converter having an input and a plurality of outputs;

a register having inputs coupled to the outputs of said analog to digital converter and having outputs;

a plurality of first switches coupled between said input of said analog to digital converter and respective ones of at least some of said external terminals and having control electrodes;

a latching circuit having inputs coupled to said internal bus for storing control data supplied from said internal bus and having outputs;

a decoder circuit having inputs coupled to the outputs of said latching circuit and outputs coupled to the control electrodes of said first switches, respectively to control operation of said first switches in accordance with said control data so that a selected one of said first switches is rendered conductive according to said control data;

a plurality of digital signal input circuits having inputs respectively coupled to said at least some of said external terminals, and outputs, each digital signal input circuit including means responsive to a control signal for setting and storing a digital signal fed from said at least some of said external terminals;

first means coupled between the outputs of said register and said internal bus to selectively provide the internal bus with first digital signals on the outputs of said register, said first means including second switches coupled with said internal bus and having control electrodes;

second means coupled between at least one of the outputs of said digital signal input circuits and said internal bus to provide the internal bus with at least one of second digital signals on the outputs of said plurality of digital signal input circuits, said second means including at least one third switch coupled with said internal bus to provide at least one digital signal, and said third switch having a control electrode; and control means coupled to the control electrodes of said second and third switches for controlling operation of said second and third switches so that said second switches are not rendered conductive at the said time as said third switch.

2. A microprocessor according to claim 1, wherein said internal bus is an internal data bus.

3. A microprocessor according to claim 1, wherein said internal bus has a plurality of bit lines, and wherein a plurality of said second switches are respectively connected to a plurality of said bit lines commonly with a plurality of said third switches.

4. A microprocessor according to claim 1, wherein said internal bus has a plurality of bit lines, and further including a plurality of digital signal output circuits having outputs respectively coupled to said at least some of said external terminals commonly with respective ones of said inputs of said digital signal input circuits, and having inputs directly connected to respective ones of said bit lines commonly with a plurality of said third switches.

5. A microprocessor according to claim 4, wherein: said digital signal output circuits further include means for storing output digital signals and fourth switches between said means for storing output digital signals and said respective ones of said bit lines, and said fourth switches having control electrodes; and said control means is coupled to said control electrodes of said fourth switches so that said fourth switches are not rendered conductive at the same time as either of said second and third switches.

6. A microprocessor according to claim 5, further including a plurality of fifth switches connected between said latching circuit and said bit lines that are commonly connected to others of said switches.

7. A microprocessor in a single-chip with a ROM, said microprocessor including:

an arithmetic and logic unit;

an internal bus;

a plurality of external terminals;

an analog to digital converter having an input and a plurality of outputs;

a register having inputs coupled to the outputs of said analog to digital converter and having outputs;

first switches coupled between said input of said analog to digital converter and respective ones of at least some of said external terminals, and having control electrodes;

a latching circuit having inputs coupled to said internal bus for storing control data supplied from said internal bus and having outputs;

a decoder circuit having inputs coupled to the outputs of said latching circuit and outputs coupled to the control electrodes of said first switches, respectively, to control operation of said first switches in accordance with said control data so that a selected one of said external terminals is electrically coupled to the input of said analog to digital converter;

a digital signal input circuit having inputs respectively coupled to said at least some of said external terminals, and outputs, each digital signal input circuit including means responsive to a control signal for setting and storing a digital signal fed from said at least some of said external terminals;

first means coupled between the outputs of said register and said internal bus to selectively provide the internal bus with first digital signals on the outputs of said register, said first means including second switches coupled to said internal bus and having control electrodes;

second means coupled between at least one of the outputs of said digital signal input circuit and said internal bus to provide the internal bus with at least one of second digital signals on the outputs of said digital signal input circuit, said second means including at least one third switch coupled to said internal bus to provide at least one digital signal, and said third switch having a control electrode; and control means coupled to the control electrodes of said second and third switches so that said second switches are not rendered conductive at the same time as said third switch.

8. A microprocessor according to claim 7, wherein there are a plurality of said digital signal input circuits having their inputs respectively directly connected to said respective ones of at least some of the external terminals, commonly connected with said first switches.

9. A microprocessor according to claim 7, wherein said internal bus is an internal data bus.

10. A microprocessor according to claim 7, wherein said internal bus has a plurality of bit lines, and wherein a plurality of said second switches are respectively connected to a plurality of said bit lines commonly with a plurality of said third switches.

11. A microprocessor according to claim 7, wherein said internal bus has a plurality of bit lines; and further including a plurality of digital signal output circuits having outputs respectively coupled to said at least some of said external terminals commonly with respective ones of said inputs of said digital signal input circuit, and having inputs directly connected to respective bit lines commonly with a plurality of said third switches.

12. A microprocessor according to claim 11, wherein said internal bus has a plurality of bit lines; said digital signal output circuits further include means for storing output digital signals and fourth switches having gate electrodes and drain-source paths between said means for storing and said respective bit lines; and said control means is coupled to said gate electrodes of said fourth switches so that said fourth switches are not rendered conductive at the same time as either of said second and third switches.

13. A microprocessor according to claim 12, further including a plurality of fifth switches connected between said latching circuit and said bit lines that are commonly connected to others of said switches.

14. A microprocessor in a single-chip, including:
an arithmetic and logic unit;
an internal bus;
a plurality of external terminals;
an analog to digital converter having an input and a plurality of outputs;
a register having inputs coupled to the outputs of said analog to digital converter and having outputs;
first switches coupled between said input of said analog to digital converter and respective ones of at least some of said external terminals, and having control electrodes;
a latching circuit having inputs coupled to said internal bus for storing control data supplied from said internal bus and having outputs;
a decoder circuit having inputs coupled to the outputs of said latching circuit and outputs coupled to the control electrodes of said first switches, to control operation of said first switches in accordance with said control data so that a selected one of analog signals fed to said at least some of said external terminals is electrically coupled to the input of said analog to digital converter;

a plurality of digital signal input circuits, each having inputs respectively coupled to said at least some of said external terminals and outputs, each digital signal input circuit including means responsive to a control signal for setting and storing a digital signal fed from said at least some of said external terminals;

first means coupled between the outputs of said register and said internal bus to selectively provide the internal bus with first digital signals on the outputs of said register, said first means including second switches coupled with said internal bus and having control electrodes;

second means coupled between at least one of the outputs of said digital signal input circuits and said internal bus to provide the internal bus with at least one of second digital signals on the outputs of said digital signal input circuits, said second means including at least one third switch coupled with said internal bus to provide at least one second digital signal, and said third switch having a control electrode; and control means coupled to the control electrodes of said second and third switches so that said second switches are not rendered conductive at the same time as said third switch.

15. A microprocessor according to claim 14, wherein said internal bus is an internal data bus.

16. A microprocessor according to claim 14, wherein said internal bus has a plurality of bit lines, and wherein a plurality of said second switches are respectively connected to a plurality of said bit lines commonly with a plurality of said third switches.

17. A microprocessor according to claim 14, further including a plurality of digital signal output circuits having outputs respectively coupled to said at least some of said external terminals commonly with respective ones of said inputs of said digital signal input circuits, and having inputs directly connected to respective bit lines commonly with a plurality of said third switches.

18. A microprocessor according to claim 17, wherein said digital signal output circuits further include fourth switches between said means for setting and storing and said respective bit lines; said control means coupled to said fourth switches so that said fourth switches are not rendered conductive at the same time as either of said second and third switches.

19. A microprocessor according to claim 18, further including a plurality of fifth switches connected between said latching circuit and said bit lines that are commonly connected to others of said switches.

20. A microprocessor in a single-chip with a ROM and a RAM, said microprocessor including:
an arithmetic and logic unit;
an internal bus;
a plurality of external terminals;
an analog to digital converter having an input and a plurality of outputs;
a register having inputs coupled to the outputs of said analog to digital converter and having outputs;
an analog multiplexer for transmitting one of analog signals on some of said plurality of external terminals to the input of said analog to digital converter, and having MISFETs;

a multiplexer control circuit, coupled to said internal bus, for controlling operation of the MISFETs in said analog multiplexer, said multiplexer control circuit having a latching circuit having inputs coupled to said internal bus for storing multiplexer control data supplied from said internal bus and having outputs, said multiplexer control circuit having decoder means coupled to gate electrodes of said MISFETs and being responsive to the multiplexer control data for decoding the multiplexer control data to provide an output signal for selecting one of the MISFETs to be rendered conductive in accordance with the multiplexer control data;

a plurality of digital signal input circuits having inputs respectively coupled to said some of said plurality of external terminals, and outputs, each digital signal input circuit including means responsive to a control signal for setting and storing a digital signal fed from said some of said plurality of external terminals;

control means being responsive to address signals for providing a selection signal in accordance with said address signals;

first switches coupled between the outputs of said register and said internal bus, and coupled to receive said selection signal;

second switches coupled between the outputs of said plurality of digital signal input circuits and said internal bus, and coupled to receive said selection signal; and said control means controlling said first and second switches so that said second switches are not rendered conductive at the same time as said first switches.

21. A microprocessor according to claim 20, wherein said digital signal input circuits have their inputs respectively directly connected to said some of said plurality of external terminals commonly connected with source-drain paths of said MISFETs.

22. A microprocessor according to claim 20, wherein said internal bus is an internal data bus.

23. A microprocessor according to claim 20, wherein said internal bus has a plurality of bit lines, and wherein a plurality of said first switches are respectively connected to a plurality of said bit lines commonly with a plurality of said second switches.

24. A microprocessor according to claim 20, further including a plurality of digital signal output circuits having outputs respectively coupled to said some of said plurality of external terminals commonly with respective ones of said inputs of said digital signal input circuits, and having inputs directly connected to respective ones of said bit lines commonly with said second switches.

25. A microprocessor according to claim 24, wherein said digital signal output circuits further include third switches between said means for setting and storing and said respective ones of said bit lines; and said control means coupled to said third switches so that said third switches are not rendered conductive at the same time as either of said first and second switches.

26. A microprocessor according to claim 25, further including a plurality of fourth switches connected between said latching circuit and ones of said bit lines that are commonly connected to others of said switches.

27. A microprocessor in a single-chip, including:
an arithmetic and logic unit;
an internal bus;
a plurality of external terminals;

an analog to digital converter having an input and a plurality of outputs;

a register having inputs coupled to the outputs of said analog to digital converter and having outputs;

an analog multiplexer for transmitting one of analog signals on some of said plurality of external terminals to the input of said analog to digital converter;

a multiplexer control circuit, coupled to said internal bus, for controlling operation of said analog multiplexer, said multiplexer control circuit having a latching circuit having inputs coupled to said internal bus for storing multiplexer control data supplied from said internal bus and having outputs, said multiplexer control circuit having decoder means being responsive to the multiplexer control data for decoding the multiplexer control data to provide an output signal for controlling the analog multiplexer in accordance with the multiplexer control data;

a plurality of digital signal input circuits having inputs respectively coupled to said some of said plurality of external terminals, and outputs, each digital signal input circuit including means responsive to a control signal for setting and storing a digital signal fed from said some of said plurality of external terminals;

first switches coupled between the outputs of said register and said internal bus;

second switches coupled between the outputs of said plurality of digital signal input circuits and said internal bus, and control means coupled to said first and second switches and being responsive to address signals for controlling said first and second switches so that said second switches are not rendered conductive at the same time as said first switches.

28. A microprocessor according to claim 27, wherein said internal bus is an internal data bus.

29. A microprocessor according to claim 27, wherein said internal bus has a plurality of bit lines, and wherein a plurality of said first switches are respectively connected to a plurality of said bit lines commonly with a plurality of said second switches.

30. A microprocessor according to claim 27, further including a plurality of digital signal output circuits having outputs respectively coupled to said some of said plurality of external terminals commonly with respective ones of said inputs of said digital signal input circuits, and having inputs directly connected to respective ones of said bit lines commonly with a plurality of said second switches.

31. A microprocessor according to claim 30, wherein said digital signal output circuits further include means for storing output digital signals and third switches between said means for storing and said respective ones of said bit lines; and said control means coupled to said third switches so that said third switches are not rendered conductive at the same time as either of said first and second switches.

32. A microprocessor according to claim 31, further including a plurality of fourth switches connected between said latching circuit and ones of said bit lines that are commonly connected to others of said switches.

33. An integrated circuit microprocessor, including:
an arithmetic and logic unit;
an internal bus;
a plurality of external terminals;
an analog to digital converter having an input and a plurality of outputs;

a register having inputs coupled to the outputs of said analog to digital converter and having outputs;

an analog multiplexer for transmitting one of analog signals on some of said plurality of external terminals to the input of said analog to digital converter and coupled between said input of said analog to digital converter and respective ones of said some of said plurality of external terminals;

multiplexer control means, coupled to said internal bus, for controlling operation of said analog multiplexer, said multiplexer control means having a latching circuit having inputs coupled to said internal bus for storing multiplexer control data supplied from said internal bus and having outputs, said multiplexer control circuit having decoder means being responsive to the multiplexer control data for decoding the multiplexer control data to provide an output signal for controlling the analog multiplexer in accordance with the multiplexer control data;

a digital signal input circuit having inputs respectively coupled to said some of said plurality of external terminals, and outputs, said digital signal input circuit including circuits responsive to control signals for setting and storing a digital signal fed from said some of said plurality of external terminals;

address decoder means being responsive to address signals for providing a selection signal in accordance with said address signals;

first switches coupled between the outputs of said register and said internal bus, and said first switches being coupled to receive said selection signal;

second switches coupled between said internal bus and the outputs of said digital signal input circuit, and said second switches being coupled to receive said selection signal; and said address decoder means controlling said second switches and said first switches so that said second switches are not rendered conductive at the same time as said first switches.

34. A microprocessor according to claim 33, wherein there are a plurality of said digital signal input circuits having their inputs respectively directly connected to said some of said plurality of external terminals commonly connected with said analog multiplexer.

35. A microprocessor according to claim 33, wherein said internal bus is an internal data bus.

36. A microprocessor according to claim 33, wherein said internal bus has a plurality of bit lines, and wherein a plurality of said first switches are respectively connected to a plurality of said bit lines commonly with a plurality of said second switches.

37. A microprocessor according to claim 33, wherein said internal bus has a plurality of bit lines; and further including a plurality of digital signal output circuits having outputs respectively coupled to said some of said plurality of external terminals commonly with respective ones of said inputs of said digital signal input circuit, and having inputs directly connected to respective ones of said bit lines commonly with said second switches.

38. A microprocessor according to claim 37, wherein said digital signal output circuits further include means for storing output digital signals and third switches between said means for storing and said respective ones of said bit lines; and said control means coupled to said third switches so that said third switches are not rendered conductive at the same time as either of said first and second switches.

39. A microprocessor according to claim 38, further including a plurality of fourth switches connected between said latching circuit and ones of said bit lines that are commonly connected to others of said switches.

40. A one-chip monolithic semiconductor integrated circuit including a microprocessor, RAM and ROM, wherein the microprocessor includes an internal data bus having data lines, an internal control bus, an arithmetic and logic unit, and a plurality of external terminals, said microprocessor further comprising:

a digital signal input circuit having a plurality of digital signal input lines respectively coupled to said plurality of external terminals;

an analog signal input circuit having an analog signal input line coupled to one of said plurality of external terminals in common with one of said digital signal input lines;

said digital signal input circuit having output lines respectively coupled to at least some of the data lines of said internal data bus;

digital signal storage means within said digital signal input circuit responsive to control signals for setting and storing digital signals received from said external terminals prior to said digital signals being placed on said data lines of said internal data bus;

address decoder means being responsive to address signals for providing a selection signal in accordance with said address signals;

first switches in said digital signal input circuit between said digital signal storage means and said internal data bus, and being selectively activated by said selection signal; and a second switch between said analog signal input circuit and said internal data bus, and being selectively activated by said selection signal.

41. An integrated circuit according to claim 40, wherein said digital signal storage means is a register; and further including input buffer means in said digital signal input circuit between said external terminals and said digital signal storage means.

42. An integrated circuit according to claim 41, further including a digital signal output circuit having output lines respectively coupled to said external terminals in common with said digital signal input lines, and having input lines respectively coupled to at least some of said data lines of said internal data bus for carrying digital output signals;

output buffer means in said digital signal output circuit for buffering the digital output signals; and said output buffer means being selectively activated for passing the digital output signals to said external terminals and being selectively deactivated for isolating the digital output signals from said external terminals.

43. An integrated circuit according to claim 42, further including digital signal output storage means within said digital signal output circuit for storing the digital output signals received from said internal data bus; and output switches in said digital signal output circuit between said internal data bus and said digital signal output storage means.

44. An integrated circuit according to claim 43, wherein said output lines of said digital signal output circuit are equal in number to and in pairs with respective ones of said digital signal input lines of said digital signal input circuit, with each pair being coupled to the same data line of said internal data bus and to the same external terminal.

45. An integrated circuit according to claim 40, wherein said analog signal input circuit includes multiplexer means having a plurality of input multiplexer lines respectively connected at one end to said plurality of external terminals in common with said digital signal input lines, having at least one multiplexer output line, and having at least one multiplexer select line for receiving a select signal to select only one of said input multiplexer lines to be directly connected to said multiplexer output line; and analog to digital converter means having an input connected to said multiplexer output line and further having a plurality of digital outputs.

46. An integrated circuit according to claim 45, wherein said multiplexer means has a plurality of multiplexer select lines and only one multiplexer output line; and decoder means having output lines connected to said multiplexer select lines and a plurality of encoded signal input lines connected to one of said internal buses.

47. An integrated circuit according to claim 46, further including storage means directly connected for receiving as inputs the digital outputs of said analog to digital converter means;

wherein said digital outputs of said analog to digital converter means are connected through said storage means to different ones of said data lines of said internal data bus; and including;

a plurality of switches respectively connected between said analog to digital converter means and said data lines.

48. A one-chip monolithic semiconductor integrated circuit including a microprocessor, wherein the microprocessor includes an internal data bus having data lines, an internal control bus, an arithmetic and logic unit, and a plurality of external terminals, said microprocessor further comprising:

a digital signal input circuit having a plurality of digital signal input lines respectively coupled to said plurality of external terminals;

an analog signal input circuit having an analog signal input line coupled to one of said plurality of external terminals in common with one of said digital signal input lines;

said digital signal input circuit having output lines respectively coupled to at least some of the data lines of said internal data bus;

said analog signal input circuit includes multiplexer means having a plurality of input multiplexer lines respectively connected at one end to said plurality of external terminals in common with said digital signal input lines, having at least one multiplexer output line, and having at least one multiplexer select line for receiving a control signal to select only one of said input multiplexer lines to be directly connected to said multiplexer output line;

an analog to digital converter having an input connected to said multiplexer output line and further having a plurality of digital outputs;

a decoder having an output line connected to said multiplexer select line and a plurality of encoded signal input lines;

a latching circuit having an output connected to said encoded signal input lines, and switches connected between said latching circuit and one of said internal buses;

address decoder means for decoding address signals and producing a selection signal; and said switches having a switch activating line directly connected to said address decoder means to receive the selection signal.

49. An integrated circuit according to claim 48, further including storage means directly connected for receiving as inputs the digital outputs of said analog to digital converter.

50. An integrated circuit according to claim 49, wherein said digital outputs of said analog to digital converter are connected to different ones of said data lines of said internal data bus; and including a plurality of switches respectively connected between said analog to digital converter digital outputs and said data lines.

51. A one-chip monolithic semiconductor integrated circuit including a microprocessor, wherein the microprocessor includes an internal data bus having data lines, an internal control bus, an arithmetic and logic unit, and a plurality of external terminals, said microprocessor further comprising:

a digital signal input circuit having a plurality of digital signal input lines respectively coupled to said plurality of external terminals;

an analog signal input circuit having an analog signal input line coupled to one of said plurality of external terminals in common with one of said digital signal input lines;

said digital signal input circuit having output lines being respectively coupled to at least some of the data lines of said internal data bus;

said analog signal input circuit includes multiplexer means having a plurality of input multiplexer lines respectively connected at one end to said plurality of external terminals in common with said digital signal input lines, having at least one multiplexer output line, and having at least one multiplexer select line for receiving a control signal to select only one of said input multiplexer lines to be directly connected to said multiplexer output line;

an analog to digital converter having an input connected to said multiplexer output line and further having a plurality of digital outputs;

said digital outputs of said analog to digital converter being coupled to different ones of said data lines of said internal data bus;

address decoder means being responsive to address signals for producing a selection signal in accordance with said address signals; and a switch means for coupling each of said digital signal input lines of said digital signal input circuit and said internal data bus, and being selectively activated by said selection signal.

52. A one-chip monolithic semiconductor integrated circuit including a microprocessor, RAM and ROM, wherein the microprocessor includes an internal data bus having data lines, an internal control bus, an arithmetic and logic unit, and a plurality of external terminals, said microprocessor further comprising:

a digital signal input circuit having a plurality of digital signal input lines respectively coupled to said plurality of external terminals;

an analog signal input circuit having an analog signal input line coupled to one of said plurality of external terminals in common with one of said digital signal input lines;

said digital signal input circuit having output lines respectively coupled to at least some of the data lines of said internal data bus;

said analog signal input circuit includes multiplexer means having a plurality of input multiplexer lines respectively connected at one end to said plurality of external terminals in common with said digital signal input lines, having at least one multiplexer output line, and having at least one multiplexer select line for receiving a control signal to select only one of said input multiplexer lines to be directly connected to said multiplexer output line;

analog to digital converter having an input connected to said multiplexer output line and further having a plurality of digital outputs;

a decoder having an output line connected to said multiplexer select line and a plurality of encoded signal input lines;

a latching circuit connected to said encoded signal input lines, and a first switch between said latching circuit and one of said internal buses;

address decoder means for decoding address signals and producing a selection signal;

second switches between said digital signal input circuit and said internal data bus, and being selectively activated by said selection signal;

third switches means connected between said analog to digital converter digital outputs and said internal data bus, and being selectively activated by said selection signal; and said first switch being selectively activated by said selection signal.

* * * * *